United States Patent
Kostecki et al.

(10) Patent No.: US 9,368,798 B2
(45) Date of Patent: Jun. 14, 2016

(54) MODIFIED CARBON BLACK MATERIALS FOR LITHIUM-ION BATTERIES

(71) Applicants: Robert Kostecki, Lafayette, CA (US); Thomas Richardson, Oakland, CA (US); Ulrike Boesenberg, Hamburg (DE); Elad Pollak, Rehovot (IL); Simon Lux, Oakland, CA (US)

(72) Inventors: Robert Kostecki, Lafayette, CA (US); Thomas Richardson, Oakland, CA (US); Ulrike Boesenberg, Hamburg (DE); Elad Pollak, Rehovot (IL); Simon Lux, Oakland, CA (US)

(73) Assignee: The Regents of the University of California, Oakland, CA (US)

(*) Notice: Subject to any disclaimer, the term of this patent is extended or adjusted under 35 U.S.C. 154(b) by 137 days.

(21) Appl. No.: 14/274,458

(22) Filed: May 9, 2014

(65) Prior Publication Data

US 2014/0370395 A1 Dec. 18, 2014

Related U.S. Application Data

(60) Provisional application No. 61/822,032, filed on May 10, 2013.

(51) Int. Cl.
*H01M 4/62* (2006.01)
*H01M 10/0525* (2010.01)
*C01B 31/02* (2006.01)
*C09C 1/56* (2006.01)

(52) U.S. Cl.
CPC ............... *H01M 4/625* (2013.01); *C01B 31/02* (2013.01); *H01M 10/0525* (2013.01); *C01P 2002/82* (2013.01); *C01P 2006/40* (2013.01); *C09C 1/565* (2013.01); *H01M 2220/30* (2013.01); *Y02E 60/122* (2013.01); *Y02T 10/7011* (2013.01)

(58) Field of Classification Search
CPC ............ H01M 4/625; H01M 10/0525; H01M 2220/30; C01B 31/02; C09C 1/565; C01P 2002/82; C01P 2006/40; Y02E 60/122; G01N 27/00

See application file for complete search history.

(56) References Cited

PUBLICATIONS

Mather et al. (Journal of Materials Science vol. 32 1997 p. 401-407).*
Mather et al. Journal of Materials Science vol. 32 1997 pp. 1711-1715.*
"Carbon black/high density polyethylene conducting composite materials", Part 1, Journal of Material Science, vol. 32, pp. 401-407, (1997).
"Carbon black/high density polyethylene conducting composite materials", Part 2, Journal of Material Science, vol. 32, pp. 1711-1715, (1997).
"Porous carbons", Sadhana, vol. 28, Parts 1 & 2, pp. 335-348, (Feb./Apr. 2003), Printed in India.

* cited by examiner

*Primary Examiner* — Patrick Ryan
*Assistant Examiner* — Aaron Greso
(74) *Attorney, Agent, or Firm* — Lawrence Berkeley National Laboratory

(57) ABSTRACT

A lithium (Li) ion battery comprising a cathode, a separator, an organic electrolyte, an anode, and a carbon black conductive additive, wherein the carbon black has been heated treated in a $CO_2$ gas environment at a temperature range of between 875-925 degrees Celsius for a time range of between 50 to 70 minutes to oxidize the carbon black and reduce an electrochemical reactivity of the carbon black towards the organic electrolyte.

3 Claims, 8 Drawing Sheets

US 9,368,798 B2

MODIFIED CARBON BLACK MATERIALS FOR LITHIUM-ION BATTERIES

CROSS REFERENCE TO RELATED APPLICATIONS

This US Application claims priority to U.S. Provisional Application Ser. No. 61/822,032 filed May 10, 2013, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Lithium-ion batteries (LIBs) are important components of portable electronic devices and are rapidly being introduced into the electric and hybrid vehicle markets. Future applications may include storage for renewable power sources and load leveling for grids.

In an effort to increase the energy density of lithium-ion batteries, high voltage cathodes that insert lithium at ~5V have been proposed. However, at these high potentials one must consider electrolyte solutions that are stable at high potentials. In addition, electrolyte oxidation can occur not only on the surface of the active material, but also on the surface of carbon, which is a common conductive additive in positive electrodes in lithium ion batteries. In an effort to increase the electrochemical window of lithium ion battery, we have examined carbons of different surface morphology and measured their reactivity towards electrolyte oxidation.

Carbon modifications are reported in the scientific literature and are the subject of numerous patents. Most of these, however, deal with the modification of graphitic materials for use as active components in anodes. A recent publication of Winter et. al. provides a good overview in the introduction about recent developments in the field of graphite modification (Journal of Power Sources, Volume 200, 15 Feb. 2012, Pages 83-91).

Looking specifically at carbon black materials, the number of efforts taken and improvements observed decreases drastically. To date, carbon black has not been thoroughly investigated in all of its possibilities due in part to the complex structure of the different carbon blacks and the use of it "only" as an additive. Some modifications examples include the use of acids or oxidizing agents. (Materials Chemistry and Physics, Volume 76, Issue 1, 28 July 2002, Pages 1-6). Therefore, there is no evidence that the herein presented modifications have been investigated so far.

Lithium-ion battery composite electrodes commonly incorporate 1-10% wt. of carbon black additives in their formulation. The promising new positive electrode materials for high-energy Li-ion batteries e.g., $LiMnPO_4$, $LiNi_{0.5}Mn_{1.5}O_4$, x $Li[Mn_{1/2}Ni_{1/2}]O_2$.y $LiCoO_2$.z $Li[Li_{1/3}Mn_{2/3}]O_2$ (x+y+z=1), which operate at relatively high potentials require new electrode materials definitions for stable performance in organic carbonate electrolytes.

Interfacial processes at Li-ion positive composite electrodes have been studied quite extensively. Organic carbonate-based electrolytes undergo oxidation at the surface of positive electrodes at potentials exceeding 4.2 V vs. $Li/Li^+$, which often leads to degradation of the electrode active and passive components. These processes result in gradual electrolyte degradation, surface film formation and gas evolution during cell operation, which affect electrochemical performance and lifetime of Li-ion cells. Most of these studies tend to focus on the electrochemical properties of the electrode active material itself, often ignoring the fact that carbon black (CB) conductive additives constitute 80-98% of the composite electrode surface area. Investigations of interfacial properties of CB additives in Li-ion negative electrodes are manifold. However, studies of electrochemical properties of carbons at potentials of lithium-ion positive electrodes are limited and tend to focus mainly at anion intercalation into graphite.

Organic carbonate electrolytes begin to undergo oxidative decomposition at carbonaceous surfaces at potentials above 4.2V. Electrolyte decomposition products adversely affect the electrochemical impedance of the electrode and they are responsible for lithium inventory shift and premature failure of Li-ion cells.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
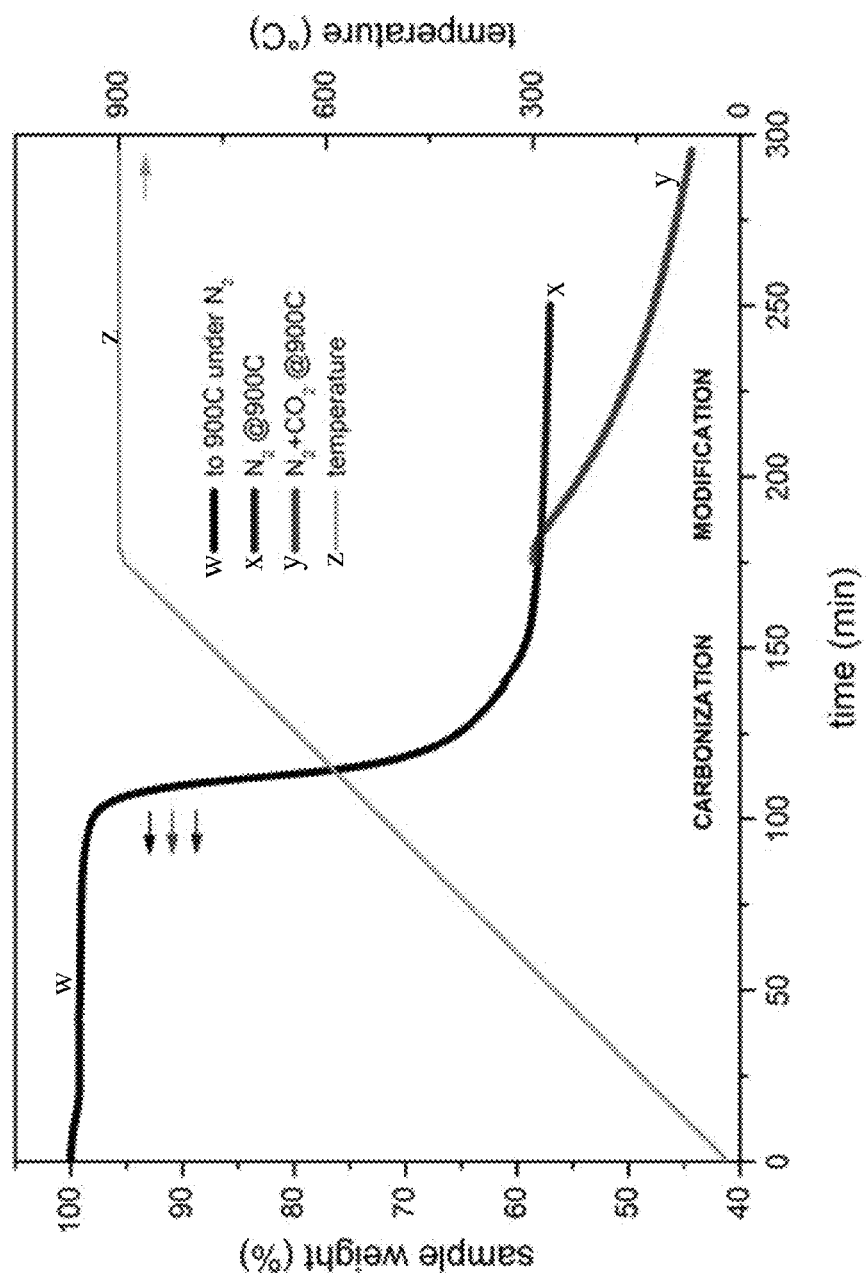
FIG. 1 illustrates TGA profiles of the Kapton thin film during the pyrolysis under $N_2$ and heat post-treatment at 900° C. under $CO_2$.

This invention addresses several key issues that affect the efficiency, performance, and lifetimes of current and future batteries. Carbon black, in various forms, is used in significant quantities as a conducting additive in both the positive and negative composite electrodes in lithium ion batteries. Due in part to its high surface area and high surface reactivity; carbon black contributes to irreversible capacity losses and degradation of cell components, especially with regard to electrolytes. The instability of commonly used electrolytes at voltages higher than 4.5 V vs. lithium is an obstacle to the use of high energy positive electrode ("cathode") materials that operate above this voltage. The carbon additives play a major role in this instability, which also affects battery safety and cost. At the negative electrode ("anode"), the carbon black additives consume active lithium during the initial charging of the battery, making it unavailable for discharging and thereby reducing the practical storage capacity of the battery. The approach is to reduce the reactivity of the carbon black by thermal pretreatment in a controlled atmosphere. The mechanism for reduction of reactivity is the removal of chemically and catalytically active moieties from the carbon surfaces.

Various embodiments disclose the following benefits:

(1) an expansion of the electrochemical stability window of conventional electrolytes, providing a path to the application of new high voltage cathode materials;

(2) a reduction in the amount of electrolyte and lithium consumed and irreversibly lost at both anodes and cathodes;

(3) a reduction in electrolyte degradation at end of charge and/or overcharge and the potential for cell damage or dangerous thermal runaway conditions.

In one embodiment, carbon blacks are heated up with a rate of 10 K/min under a constant nitrogen flow up to a temperature of approximately 900° C. At this temperature the gas is changed and the carbon black is processed with carbon dioxide ($CO_2$) in ranges varying from 15 minutes to 125 minutes, and for a specific time, for example, 60 minutes. This significantly removes impurities on the surface of the carbon (such as oxygen surface groups i.e., carbonyl, carboxyl, hydroxyl, etc.) which may promote electrolyte oxidation and reduces the catalytic surface reactivity upon high voltage exposure. The surface is homogenized and smoothed during the treatment. The treated carbon black is used to fabricate electrodes by standard procedures used in lithium ion battery manufacturing.

In one embodiment, a typical composition is 10% polyvinylidene fluoride (PVDF) and 90% active material, as a processing solvent N-Methyl-2-pyrrolidone (NMP) was applied. Electrodes were investigated regarding their electrochemical response in three-electrode beaker cells with metallic lithium as both counter and reference electrode. A conventional electrolyte mixture of ethylene carbonate (EC):diethyl carbonate (DEC) 1:2 with 1.0 M Lithium hexafluorophosphate ($LiPF_6$) was used. The electrodes containing the modified carbon blacks were monitored regarding the electrolyte decomposition onset voltage, their current density and all together their electrochemical activity. The electrolyte decomposition onset was shifted to higher voltages and the current density of the degradation reaction (equals the amount of electrolyte decomposed) was decreased by an order of magnitude compared with electrodes made with untreated carbon black. Various embodiments disclose that the $CO_2$ treatment procedure affects the electrochemical properties of the carbon electrode and makes it less catalytic towards electrolyte oxidation.

Overall, the $CO_2$ treatment process provides a viable, scalable method to modify carbon blacks to reduce their electrochemical surface activity and improve their application properties for LIBs.

In one embodiment, an examination of composite electrode carbon black (CB) additives at elevated potentials in lithium-ion cells was conducted. The work led to the development of a high-temperature treatment of CBs to lower the electrocatalytic properties and increase the surface stability of this class of materials at voltages exceeding 4.5 V vs. $Li/Li^+$. This modification of the sample is based on a HT surface treatment with various oxidative agents. It was found that $CO_2$ at 900° C. acts as an effective oxidative agent to modify the surface of CB but preserve the original bulk structure and morphology. This approach was originally investigated utilizing model samples e.g., carbon black obtained from pyrolysis of polyimide thin-films.

The electrochemical response of a model pyrolytic carbon thin-film electrode in an organic carbonate electrolyte at potentials that correspond to the operation range of high-energy Li-ion positive electrodes was investigated to evaluate the effect of $CO_2$ heat-treatment on the carbon interfacial reactivity.

The electrochemical reactivity of polyimide-derived pyrolytic carbon thin-film electrodes in a standard organic carbonate lithium-ion battery electrolyte was studied and quantified. An oxidative heat treatment at 900° C. under $CO_2$ atmosphere was found to lower the reactivity of disordered carbons towards the electrolyte oxidation. Cyclic voltammetry and potentiostatic measurements of the carbon thin-film electrodes demonstrate the beneficial effect of the $CO_2$ heat treatment in the potential range between 4.2 and 4.8 V vs. $Li/Li^+$ i.e., at potentials where high-energy Li-ion positive composite electrodes operate.

EXPERIMENTAL

Highly disordered carbon thin-film electrodes were produced by temperature-programmed pyrolysis of high purity KaptonHN sheets (Goodfellow Cambridge Limited, thickness 0.125 mm) under a constant nitrogen flow ca. 10 ml/min in a tubular furnace. A linear temperature ramp from room temperature to 900° C. over 180 minutes was applied followed by 60 minutes of heat treatment at 900° C. The oxidative $CO_2$-surface treatment was conducted at 900° C. under $CO_2$ flow. Thin-film carbon samples were slowly cooled down under nitrogen flow to room temperature and transferred into a glove box (Nexus II, VAC-$H_2O$, $O_2$<1 ppm) where all electrochemical measurements were carried out.

Specific surface area of the carbon thin-films was measured using the Brunauer-Emmet-Teller (BET) method (Micromeritics TriStar™ II 3020) after degassing at 200° C. for 60 minutes under vacuum. Raman spectra of the pyrolytic carbon thin-films were collected with a Raman microscope system (Labram, Horiba Jobin Yvon USA, Inc.) in the backscattering configuration. Electrochemical measurements of the carbon thin-film electrodes were performed in a three electrode beaker cell filled with 1 M $LiPF_6$, ethylene carbonate (EC):diethyl carbonate (DEC) (1:2 weight ratio) electrolyte (Novolyte Technologies, Inc.). High purity lithium foil (FMC Lithium) was used as counter and reference electrodes.

Cyclic voltammetry (CV) scans were carried out at a scan speed of 1 mV/s and quasi steady-state potentiostatic step (PS) measurements were performed at 125 mV increments and 60 min polarization time at each step. All potentials are reported vs. $Li/Li^+$ reference electrode.

RESULTS AND DISCUSSION

Figure 2:
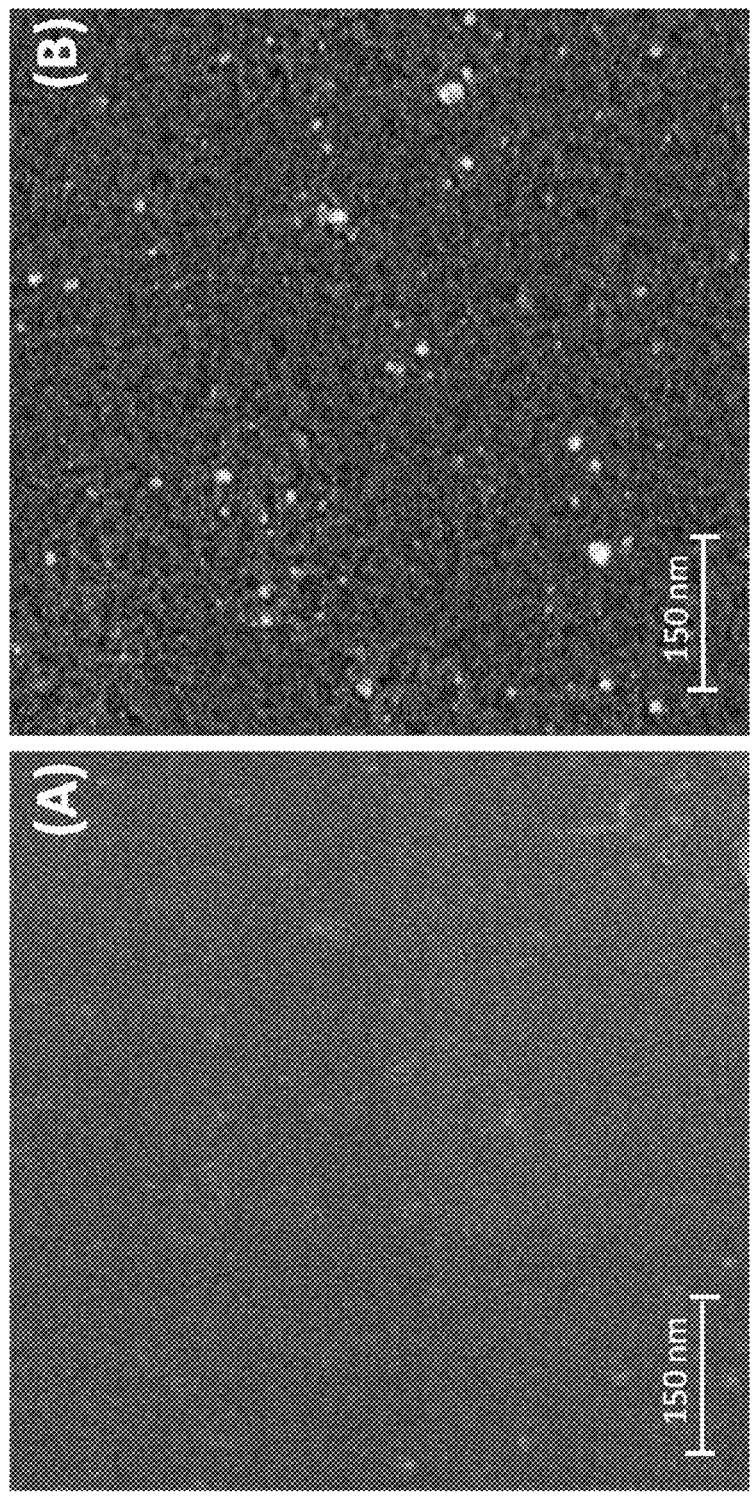
FIG. 2 illustrates SEM images of pristine (A) and after 1 hour of $CO_2$ heat-treatment (B) pyrolytic carbon black films.

The pyrolysis process of the precursor polyimide layer at 900° C. under nitrogen leads to formation of a highly disordered carbonaceous thin-film. FIG. 1 shows a TGA plot of the pyrolysis and the following heat-treatment processes under $N_2$ or $CO_2$. The early weight loss of the polyimide precursor thin-film at T>550° C. corresponds to the burning-off of the oxygen groups and subsequent carbonization of the sample. At 860° C. the pyrolysis process is completed and no further weight loss is observed under nitrogen. The pyrolytic carbon films exhibit a relatively high surface area of 20.33 m²/g and electronic conductivity ca. 89 Scm⁻¹. The resultant carbon thin-film shows a dense and homogenous surface morphology with a few pin holes and cavities (FIG. 2A). Prolonged (2 hours) heat treatment at 900° C. under nitrogen does not alter the carbon film surface area, morphology, electronic conductivity and electrochemical reactivity.

The post-pyrolysis heat treatment at 900° C. under $CO_2$ corresponds to the reverse Boudouard reaction,

$$C_{(s)} + CO_{2(g)} \rightarrow 2CO_{(g)} \tag{1}$$

which results in mild carbon surface oxidation, including removal of surface chemical functional groups, sp-coordinated surface carbon atoms, and gradual formation of pores and increase of the surface area upon prolonged heat treatment. The rate of carbon oxidation depends on the type of carbon e.g., disordered vs. graphitic, $CO_2$ pressure and temperature. The rate of carbon black oxidation at 900° C. is also directly proportional to the surface area per unit of carbon mass. Typically, 2 hour-long heat treatment at 900° C. under $CO_2$ leads to ca. 13% loss of the carbon black mass and significant increase of the surface area from 20.33 to 194.14 m²/g. Interestingly, the post-pyrolysis heat treatment at 900° C. under $CO_2$ does not affect the carbon film electronic conductivity, which indicates that the oxidation reaction occurs mainly at the carbon surface.

Figure 3:
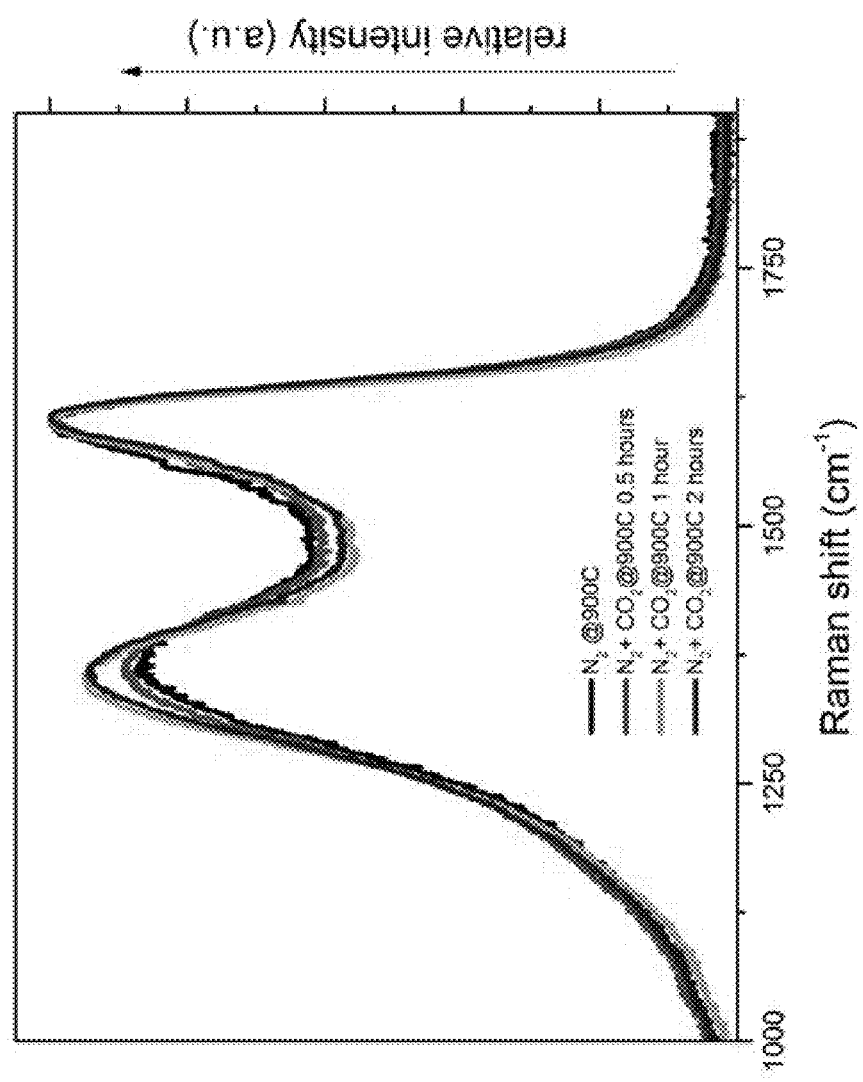
FIG. 3 illustrates a Raman spectra of the pristine pyrolytic carbon black thin film and after 0.5, 1 and 2 hours of heat treatment at 900° C. under $CO_2$.

The SEM image of the $CO_2$ heat-treated carbon film (FIG. 2B) displays increased roughness and porosity that is evenly distributed across the carbon thin-film surface. The Raman spectra of the modified carbon films (FIG. 3) consists of two broad peaks at around 1600 and 1365 cm⁻¹, which correspond to the graphite G- and D-band, respectively. D/G peak integrated intensity ratio in disordered carbons, which amounts for vibrations from $A_{1g}$ mode associated with the breakage of symmetry of graphite sheets vs. regular in-plane $E_{2g}$ mode, is strongly correlated with the size of graphitic domains in the material and the structural disorder.

Thermal $CO_2$ activation of the pyrolytic carbon film at 900° C. led to a slight sharpening of the Raman peaks and band positions shift from 1365 to 1350 cm⁻¹, and from 1600 to 1605 cm⁻¹ for D- and G-band, respectively. The D/G peak ratio decreased from 0.71 for pristine pyrolized carbon black film to 0.65 for the $CO_2$-activated sample after 1 hour of $CO_2$-activation. The D/G ratio decrease and G- and D-peak sharpening are usually associated with a decrease in the number of structural defects and/or increase of the size of graphene domains in the material. Interestingly, prolonged (>1 hour) $CO_2$ heat-treatment has led to slightly increased porosity of the carbon film but no changes in the Raman spectra were observed. Thus the observed decrease of the amount of surface structural defects of carbon black films appears to happen during the initial stages of carbon thermal oxidation by $CO_2$.

The cyclic voltammograms of the pristine and the $CO_2$ heat-treated pyrolytic carbon black thin-film electrodes (FIG. 4A) show pure capacitive behavior in the potential region between 2.5 and 4 V. However, at potentials above 4 V, the anodic current for the pristine carbon black film increases significantly, which corresponds to electrolyte oxidation reactions at the carbon black surface. Importantly, the anodic current for $CO_2$ heat-treated electrode tends to decrease slightly or remains constant at potentials up to 5.75 V. It appears that the electrolyte oxidation reactions are strongly suppressed on the $CO_2$ heat-treated carbon black electrodes.

To quantify the effect of the $CO_2$ heat-treatment on the electrochemical reactivity of the carbon electrodes, quasi steady-state potentiostatic step (PS) measurements were carried out between 3.25 and 5.75 V at 125 mV increments and 60 min polarization time at each step.

Figure 4:
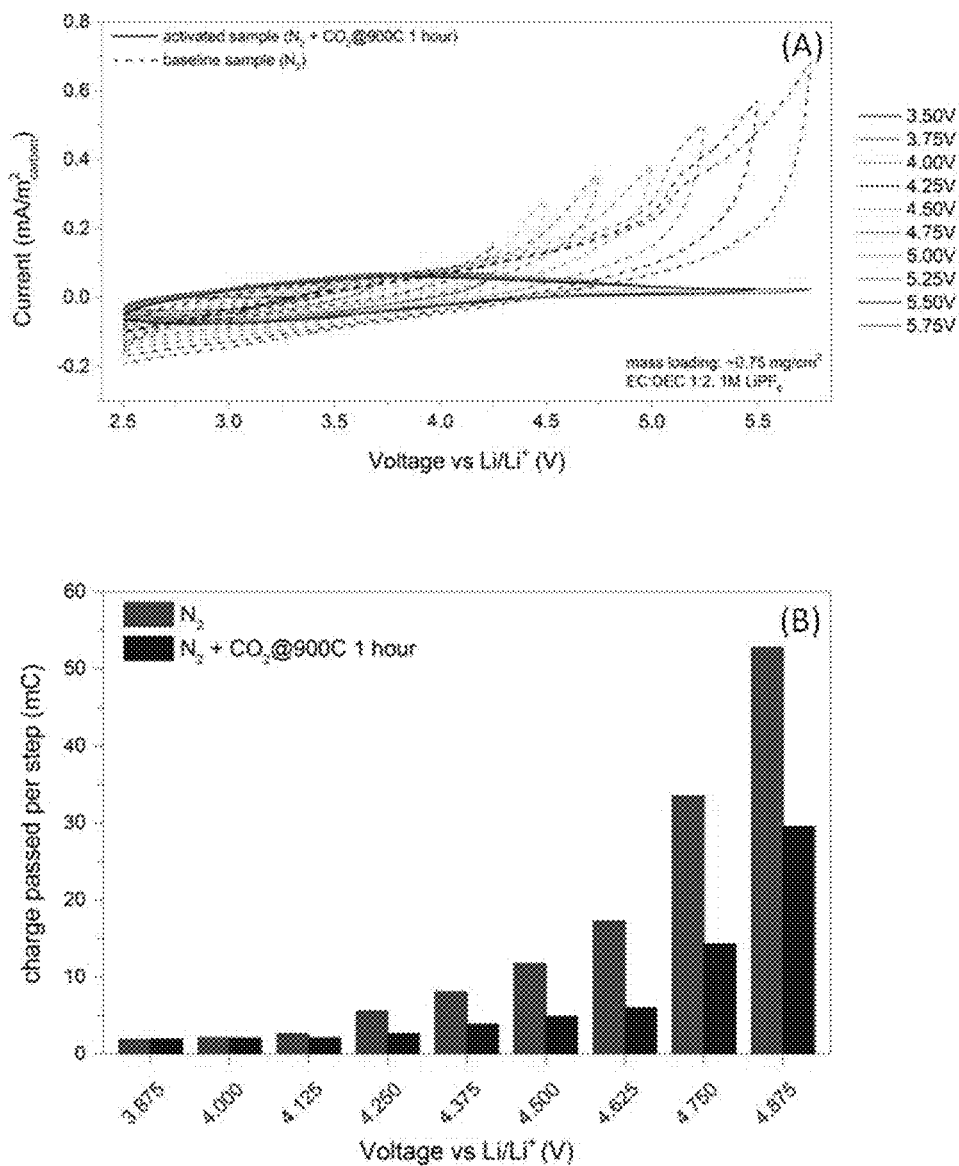
FIG. 4 illustrates a cyclic voltammograms at 1 mV/s of the pristine pyrolytic carbon black electrode and after $CO_2$ heat-treatment at 900° C. for 1 hour (A). Total anodic charge consumed during quasi steady-state potentiostatic step (PS) measurements between 3.875 and 4.875 V at 125 mV increments and 60 min polarization time at each step for the pristine and $CO_2$ heat-treatment electrodes (B).

The total anodic charge consumed during these 60 min steps, which can be entirely attributed to the electrolyte oxidation, as the function of the electrode potential is shown in FIG. 4B.

The total anodic charge for electrolyte oxidation processes for the pristine carbon black electrode increases sharply at 4.25 V whereas the $CO_2$ heat-treated carbon black displays a similar steep rise in anodic charge at 4.75 V. Surprisingly, this appears to be in contrast with the anodic current behavior observed in the CVs, which show very little electrochemical activity up to 5.75 V. However, one has to keep in mind that the time span of the corresponding CV scan at 1 mV/s required only ca. 0.7 h vs. 20 h long PS experiment. So, a prolonged polarization of the $CO_2$ heat-treated carbon black at high potentials can still induce some limited electrolyte oxidation but to a much lesser extent than for the untreated CB electrode.

Overall, both the CV and the PS measurements clearly demonstrate the positive effect of the heat-treatment under $CO_2$ atmosphere on the interfacial carbon black electrochemical activity in organic carbonate electrolytes at high potentials. The observed effect is most likely caused by the removal of sp-coordinated carbon atoms from the exposed edges of sp² domains and surface functional groups, which exhibit higher affinity toward electrolyte oxidation at high potentials. These preliminary results provide a useful hint for effective remedies to unwanted electrochemical reactivity of standard carbon black conductive additives in high-energy positive electrodes in Li-ion cells.

Another embodiment discloses promising results. To investigate the electrochemical behavior of the carbon black (CB) samples, CB electrodes prepared utilizing carbon black Super-P® provided by Timcal and heat-treated in $CO_2$. The carbon black Super-P® was used as received and a defined amount of the powder (600 mg) was spread in an alumina crucible and transferred in a tubular furnace. There a thermal modification procedure with varying oxidative treatment durations was applied. After cooling down to room temperature, the samples were balanced and stored in a glovebox until used in the electrode preparation process.

CB electrodes were polarized at the open-circuit potential, and then potential steps were applied at 125 mV increments for 60 min each, and the current response was recorded. The current spike at the beginning of each potential step pulse can be attributed to a capacitive behavior of the carbon black, whereas the charge consumed later in the 60 minutes is mainly correlated to oxidative processes occurring at the CB electrode surface.

Figure 5:
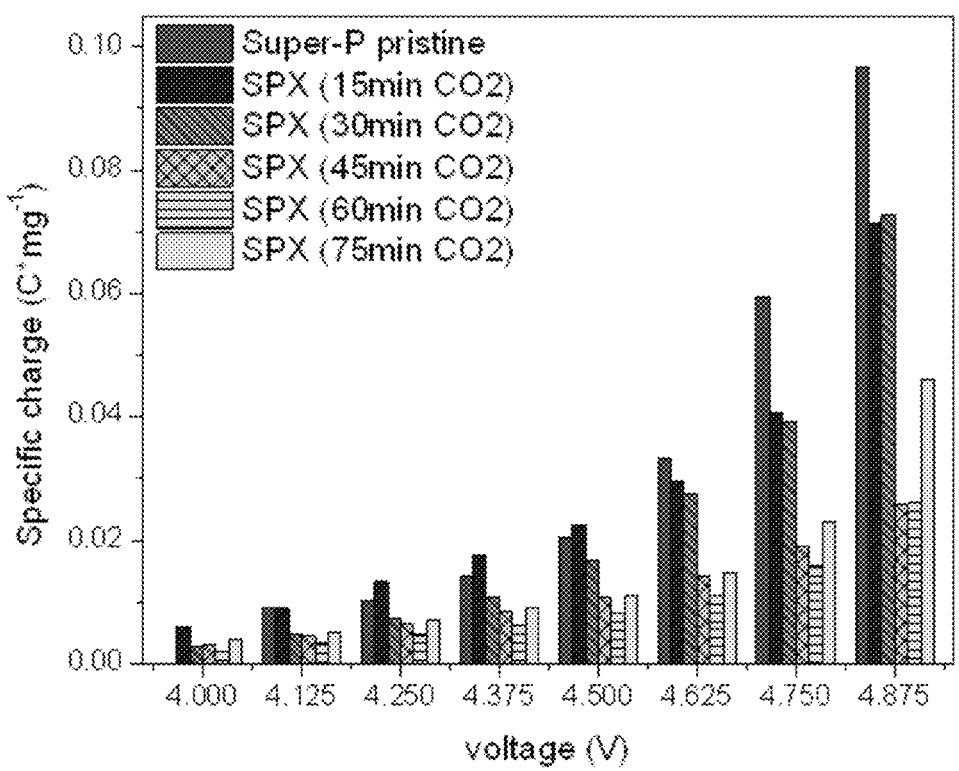
FIG. 5 illustrates a specific charge of potentiostatic step investigation of pristine and heat-treated Super-P samples.

To evaluate the overall rate of electrochemical electrolyte oxidation reactions, two different parameters were used: (i) the charge consumed during the entire potentiostatic step, and (ii) the current value at the end of the step. FIG. 5 depicts the charge per mg of carbon in electrodes composed solely of carbon black (pristine or heat-treated) and PVdF.

Figure 6:
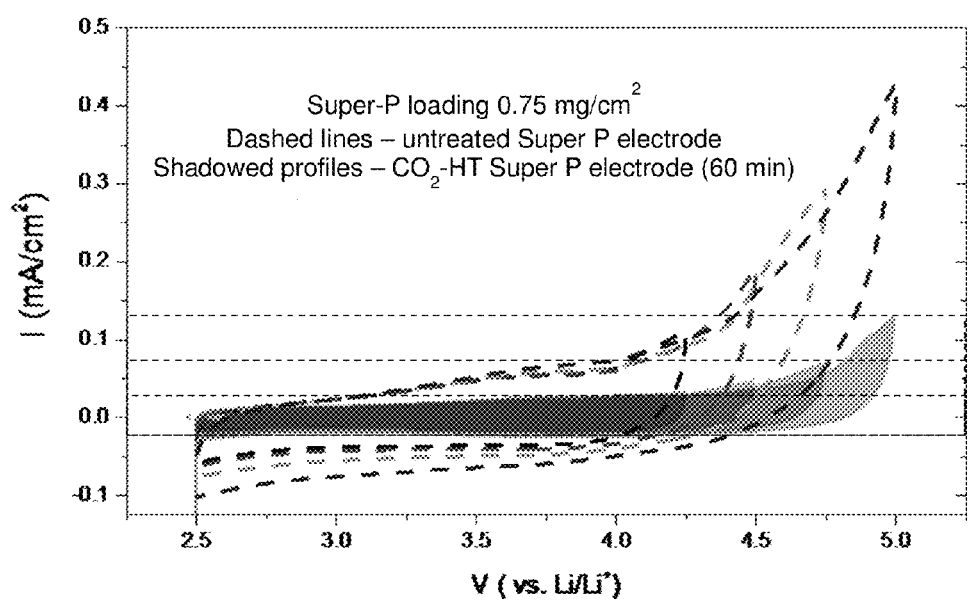
FIG. 6 illustrates a cyclic voltammogram for untreated pristine (dashed lines) or $CO_2$ heat treated (shadow profile) Super-P carbon black.

The charge consumed during the entire step clearly indicates the decreased reactivity of CB towards the electrolyte of the $CO_2$ heat-treated samples. Consistent with the Raman spectroscopy results, this positive effect appears to reach its maximum extent after 45 to 60 minutes of $CO_2$ heat treatment. This is in concert with the cyclic voltammetry results shown in FIG. 6 where the treated CB electrodes display currents lower by almost an order of magnitude than untreated CB samples. FIG. 6 illustrates two important points, there is a higher onset potential for electrolyte decomposition for CO$_2$ heat-treated carbon black electrodes and a lower electrolyte reduction current at comparable mass loading and similar surface area.

Figure 7:
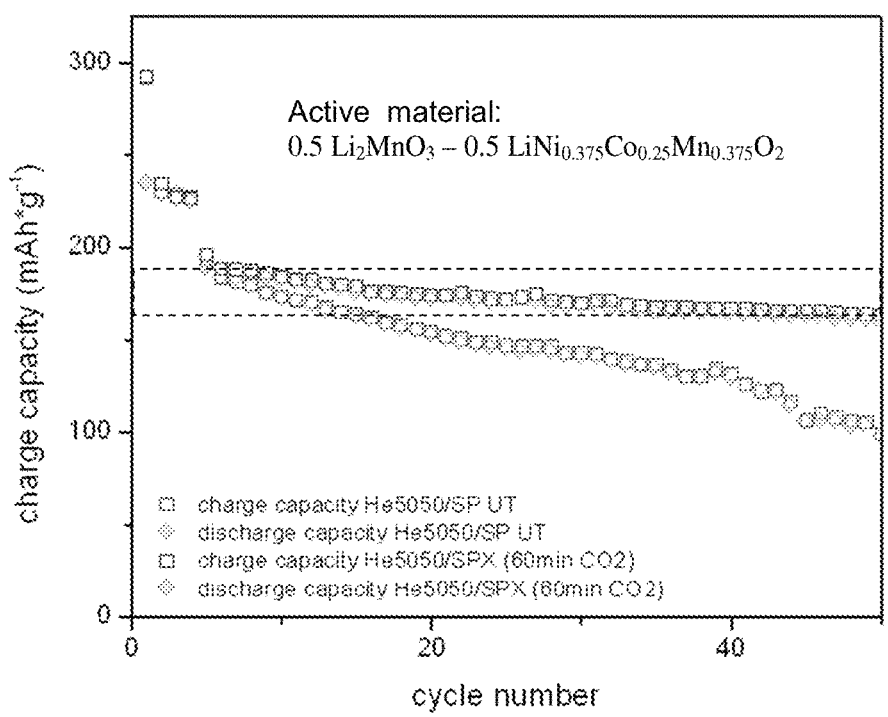
FIG. 7 illustrates a charge/Discharge capacity vs. cycle number of coin cells utilizing Toda He5050 (0.5 $Li_2MnO_3$-0.5 $LiNi_{0.375}Co_{0.25}Mn_{0.375}O_2$) and pristine (red) or heat treated (blue) carbon black.

Another embodiment discloses that composite cathodes comprising 0.5 Li$_2$MnO$_3$-0.5 LiNi$_{0.375}$Co$_{0.25}$Mn$_{0.375}$O$_2$ (Toda He5050) were manufactured with pristine and modified carbon black additives. The active material loading was 8.5 mg/cm$^2$ for both types of electrode. Model coin cells containing the electrodes were charged/discharged per protocol. FIG. 7 depicts the charge/discharge behavior of the cells with cathodes containing pristine and modified CB additives. The capacity and columbic efficiency during the initial cycles are comparable for both systems. However after changing the C-Rate from C/12 to C/3 (after cycle 4) a difference in performance becomes obvious.

The charge capacity of the "unmodified" cathode decreases gradually whereas the capacity of the modified electrode remains quite stable over 50 cycles. This indicates that the electrolyte decomposition is hindered and the negative impact of the chemical cross talk in the cell is diminished.

Figure 8:
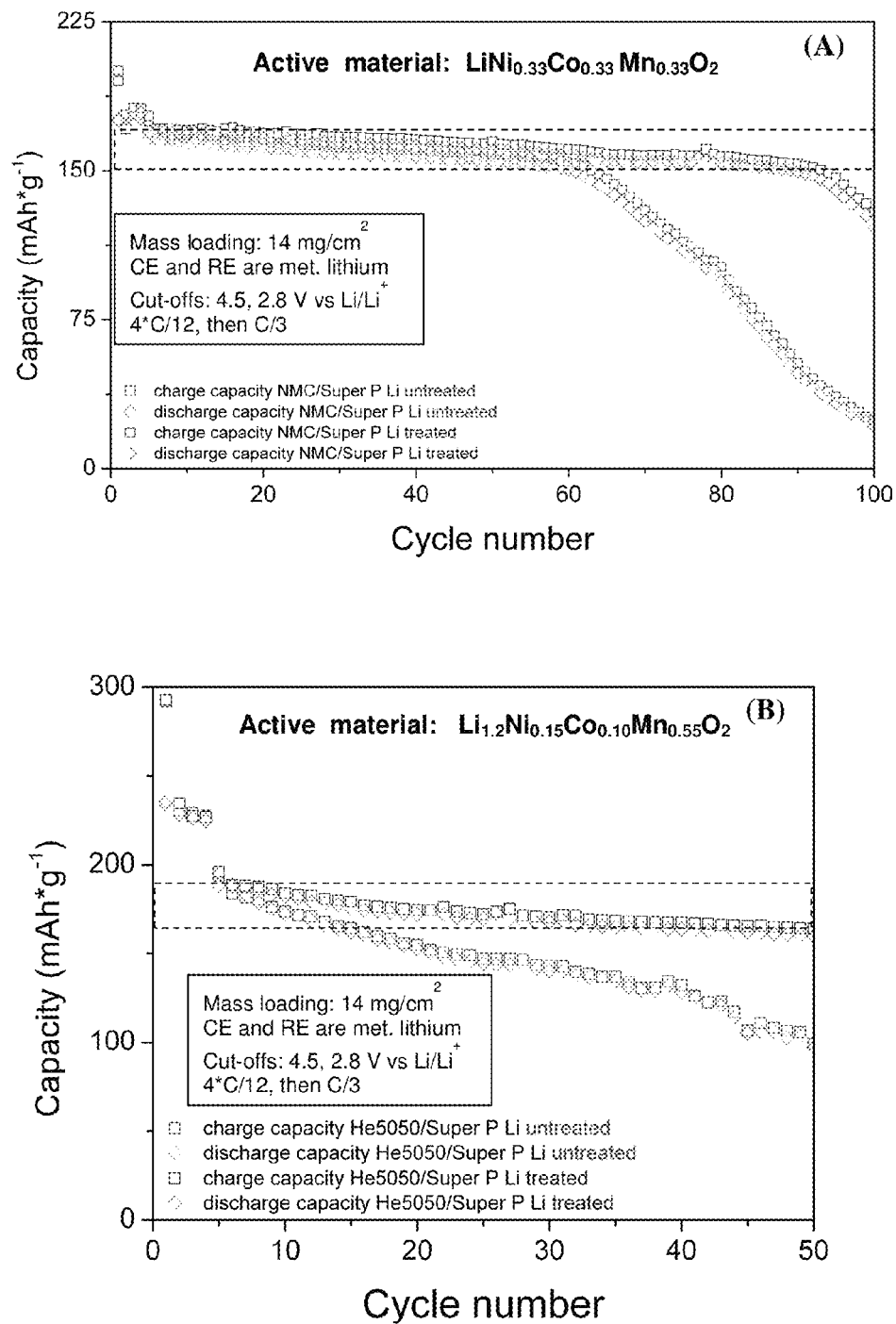
FIG. 8 illustrates a charge/discharge behavior of the cells with cathodes ($LiNi_{0.33}Co_{0.33}Mn_{0.33}O_2$ and $Li_{1.2}Ni_{0.15}Co_{0.10}Mn_{0.55}O_2$) containing pristine and modified CB additives.

In another embodiment, treated carbon black is utilized in composite electrodes and compared with electrodes using the pristine counterpart, the difference is obvious. FIG. 8 illustrates the charge/discharge behavior of the cells with cathodes (LiNi$_{0.33}$Co$_{0.33}$Mn$_{0.33}$O$_2$ and Li$_{1.2}$Ni$_{0.15}$Co$_{0.10}$Mn$_{0.55}$O$_2$) containing pristine and modified CB additives. In LiNi$_{0.33}$Co$_{0.33}$Mn$_{0.33}$O$_2$ based electrodes (with an elevated cut-off potential of 4.5 V) the lifetime of the cell is increased by 50%. In Li$_{1.2}$Ni$_{0.15}$Co$_{0.10}$Mn$_{0.55}$O$_2$ based cells, the capacity degradation after the phase transformation is limited, compared to the pristine counterpart with more than 180 mAh/g reversible capacity after 50 cycles.

This effect is mainly due to the limited electrolyte decomposition on the carbon black, which stabilizes the whole composite electrode system. This is also reflected in the CV above, the current density on the same surface is lowered by a factor of 5, whereas the consumed charge is decreased by a factor of 7.

CONCLUSIONS

Carbon dioxide heat-treatment at 900° C. of the polyimide-derived pyrolytic carbon black thin-film electrode reduced substantially its electrochemical reactivity toward the organic carbonate electrolyte at potentials above 4 V vs. Li/Li$^+$. This beneficial effect is associated with "smoothing" of sp$^2$ carbon domain edges during the initial stage of carbon oxidation by CO$_2$. Prolonged carbon oxidation under CO$_2$ atmosphere leads to surface etching, which results in increased carbon porosity but has no adverse effects on the electrochemical activity.

In addition, for composite electrodes utilizing CO$_2$ heat-treated carbon black, it was demonstrated that untreated carbon black contributes significantly to the electrolyte degradation at elevated potentials and that this effect could be suppressed by inventive pretreatment. The CO$_2$ heat-treatment reduces the amount of surface impurities/dangling bonds in the system and smoothens the particle surfaces. This results in a reduced surface activity and an increased stability towards electrolyte oxidation at elevated potential. Potentiostatic profile investigation indicated that the amount of electrolyte consumed at the carbon black at 4.65 V is lowered by an order of magnitude.

The carbon black utilized in composite electrodes increases the lifetime of state-of-the-art cathode materials and enhances the reversibility without changing or modifying the active material in the electrode itself. Less or no electrolyte decomposition products are then present in the pores and can therefore lessen or reduce the attack the active material.

What is claimed is:

1. A method of treating carbon black to reduce an electrochemical reactivity of the carbon black towards an organic electrolyte, comprising:
    a. heat the carbon black in a CO$_2$ gas environment at a temperature range of between 600-1200 degrees Celsius for a time range of between 1 to 120 minutes to oxidize the carbon black surface and reduce the electrochemical reactivity; and
    b. measure the carbon black electrochemical reactivity using a cyclic voltammetry technique to determine an electrochemical current in response to an electrochemical polarization in the voltage range of between 2.5 to 5.0 volts versus a Li/Li$^+$ reference potential, wherein a treated carbon black produces an electrochemical current in a range of between −0.025 and +0.075 mA/cm$_2$ in the voltage range of between 2.5 to 4.75 volts.

2. The method of claim 1, wherein a treated carbon black produces an electrochemical current in a range of between −0.025 and +0.025 mA/cm$_2$ in the voltage range of between 2.5 to 4.25 volts.

3. The method of claim 1, wherein the carbon black has been heated treated in the CO$_2$ gas environment at the temperature of 900 degrees Celsius for the time of 60 minutes.

* * * * *